3,175,911
INFUSION DEVICE FOR COFFEE OR TEA

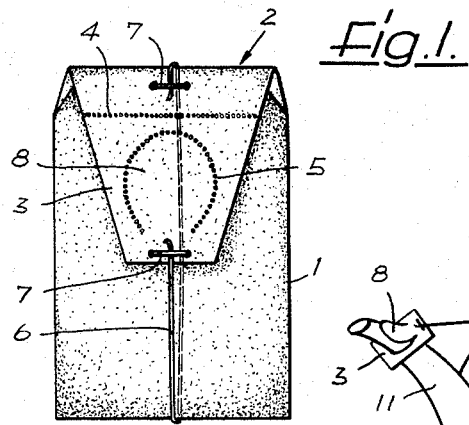
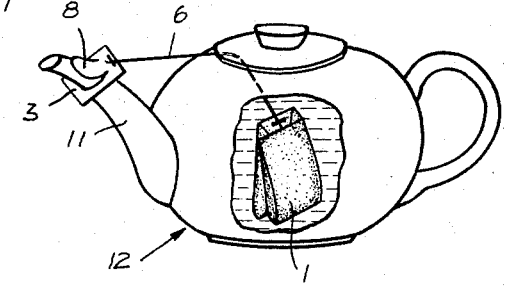
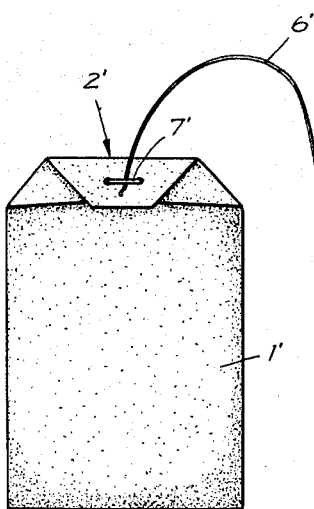
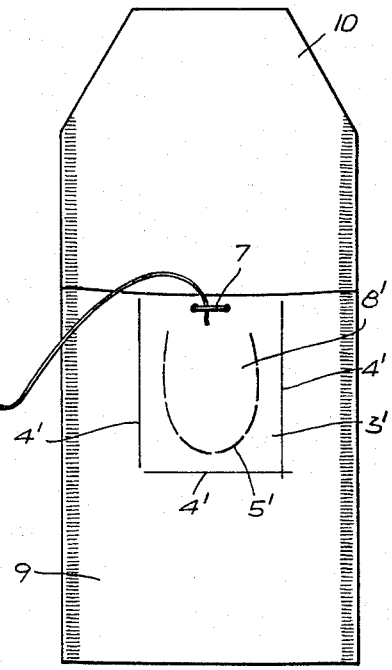

Adolf Rambold, Buderich, near Dusseldorf, Germany, assignor to Teepack Spezialmaschinen G.m.b.H. & Co., Buderich, near Dusseldorf, Germany, a corporation of Germany
Filed Apr. 24, 1962, Ser. No. 189,868
4 Claims. (Cl. 99—77.1)

The present invention relates to improvements in infusion bags for tea, coffee, or the like, and more particularly to such a device which is intended to be inserted into a suitable container such as a tea or coffee pot or even into a cup for preparing a smaller quantity of the particular beverage therein, while a small handling tag which is attached to the bag by a string hangs outside of the container and permits the bag to be withdrawn when the beverage in the container has reached its desired concentration.

The device as a whole may merely consist of the infusion bag, the string or thread, and the handling tag or it may also comprise a covering or envelope which contains the bag before it is used.

This conventional type of infusion bag has the disadvantage that the string which is hung over the rim of the container to the outside may easily slip together with the tag on its end into the container. The procedure of then fishing the tag and string or the bag itself out of the container, is not only very annoying, but usually takes so much time that when it is finally accomplished the respective beverage has often reached such a degree of concentration that it is no longer palatable.

It is an object of the invention to provide a very simple device which permits the handling tag on the string of the infusion bag to be easily secured to some projection on the outside of the container, for example, to the spout of a tea or coffee pot or to the handle of a cup so that it cannot accidentally slide into the container.

Another object of the invention is to provide such a device with a handling tag which, when attached to the spout of a pot will also serve as a drop catcher so as to take up or even absorb any drops which might run down along the spout after a part of the contents of the pot has been poured out.

A further object of the invention is to provide a device of the mentioned type which may be very inexpensively produced and may form either an integral part of the original infusion bag or of an envelope containing the same, and may be easily severed therefrom, for example, by perforations.

The above-mentioned objects are attained according to the invention by providing the tag which is connected to the infusion bag by a string with a suitable opening by means of which the tag may be slipped over the spout of a coffee or tea pot or over the handle of a cup and will then adhere thereon until intentionally removed. If the handling tag according to the invention is to be attached to a tea or coffee pot, it is preferably made of an annular shape or the opening therein is made of a circular or oblong shape so that it will engage at least with the lower side of the spout and will thus be able to take up or even absorb any drops which might be running down from the opening of the spout. For the handle of a cup, however, the opening is preferably elongated and may, for example, be formed by a slit in the material of the tag through which the handle is pressed.

At least the infusion bag itself consists in the conventional manner of a thin fibrous but relatively tough filter material which is pervious to liquids. If the tag originally forms an integral part of the bag it will automatically also consist of an absorbent material and will therefore serve excellently as a drop absorber. The envelope for the bag may consist of ordinary paper, although—especially if the tag originally forms a part of the envelope—it may also consist of an absorbent material.

For attaining the desired shape of the opening in the tag, the tag may be provided with a slit, a line of perforations, or the like, or a line formed by a reduction in the thickness of the tag material, and this slit or line may have a shape in accordance with the peripheral shape of the part to which the tag is to be attached. Thus, if it is to be attached to the spout of a coffee or tea pot, the slit or line preferably has a shape in accordance with the peripheral shape of the spout, especially at the side which is intended to engage with the lower side of the spout. By means of such a slit, line of perforations, or line of thinner material it is possible to sever the central part very easily from the remainder of the tag by pressing upon this central part so that the desired opening will then be formed in the tag. The ends of the indented line in the tag do not have to meet so as to form a complete circle or oblong, but this circle or oblong may be incomplete so that, when the central part is pressed out, it will remain on the tag in the form of a flap or tongue.

The device according to the present invention has the advantage that it may be made at a considerable saving in labor and material since the tag does not have to form a part separate either from the bag or from the envelope but may be made integral with one or the other, and may also form a means for securing the string carrying the bag to the respective container and a means for catching or absorbing the drops which may run off the spout of a tea or coffee pot.

The objects, features, and advantages of the present invention will become more clearly apparent from the following detailed description which is to be read with reference to the accompanying sheet of drawings, in which—

FIGURE 1 shows an infusion bag according to the invention which is provided with a handling tag which in the closed position of the bag in which it is sold forms an integral part of the bag;

FIGURE 2 shows an infusion bag together with an envelope in which it is sold to which it is connected by a string on a part which may be severed from the envelope so as to form the handling tag; while FIGURE 3 shows an infusion bag according to the invention inserted into a tea pot, a part of which is broken away to reveal the bag therein, the tag of which is hooked upon the spout of the pot.

Referring to the drawings, the infusion bag 1 as illustrated in FIGURE 1, which may contain tea, powdered coffee, or the like, may be of any desired shape. It is provided at one end with a closure which may be formed by folding over the free end portion of the bag 1 so as to form a flap 2. This flap 2 has an extension which is adapted to be easily severed from the closure part 2 and then forms a handling tag 3 for withdrawing the bag from a container in which the particular beverage is prepared. For this purpose, a line of perforations 4 or the like may be provided between the closure part or flap 2 and the tag part 3 which permits this part 3 to be easily torn off. This tag part or handling tag 3 is likewise provided with a line of perforations 5 which is made of a shape substantially in accordance with the peripheral shape of the part of a container to which tag 3 is to be attached. In the particular embodiment of the invention as illustrated in the drawings, it is assumed that the infusion bag is to be attached to the projecting tubular spout of a tea or coffee pot. The line of perforations 5 in tag 3 is therefore made of a substantially circular or oval shape, similar to the cross-sectional shape of the spout, but the ends of this line 5 do not meet, so that the resulting shape of line 5 is similar to the outline of a horseshoe. The closure part or flap 2 and the severable tag part 3 of the bag 1 are connected to each other by a string 6 which is secured to the two parts of bag 1 by staples 7, the upper one of which also serves to close the bag by being stapled through the layers of the bag 1 itself as well as through the layers of flap 2. After the tag part 3 has been severed from bag 1, it still remains connected thereto by the string 6. The central part 8 of tag 3 which is formed by the line of perforations 5 may then be partly severed from the remainder of the tag by the pressure of a finger thereon or by pressing the tag over the end of the spout 11 of a coffee or tea pot 12, as illustrated in FIGURE 3. This central part 8 then forms a tongue which, when the tag 3 is slipped over the end of spout 11 will be bent upwardly and will then rest with a certain clamping pressure on the spout 11. Since tag 3 consists of the same absorbent material as bag 1, it excellently serves the double purpose of securing the bag string 6 to spout 11 so that the string cannot slip into the pot 12, and of not only catching but even absorbing any drop of liquid which, after a part of the contents of the pot has been poured out, might run down from the end opening of the spout. Although the tag portion 3 is preferably designed and originally secured to bag 1 in the manner as shown, since the entire infusion bag may thus be very easily and inexpensively produced, it may, of course, also be of a different design and differently connected to the bag, so as to be easily severed therefrom.

FIGURE 2 shows a modification of the invention, in which the infusion bag 1' before being used is enclosed by an envelope or pocket 9. This envelope has a flap 10 which when closed keeps the bag 1' in a sanitary condition by preventing it from being touched. This is the condition in which the infusion bag 1' according to FIGURE 2, filled with tea, coffee, or other beverage substance, is sold on the market. In FIGURE 2, flap 10 is shown in the open position after bag 1' is withdrawn from the envelope 9. The top closure 2' of the bag to which a string 6' is again secured by a staple 7' which also closes the top fold of the bag 1', is connected by means of this string 6' to a part 3' of the envelope 9 to which the string 6' is likewise secured by a staple 7'. This part 3' is partly separated from the remainder of envelope 9 by a line of perforations or by several slits 4'. This part 3' which after being severed from the envelope 9 forms a handling tag similar to and for the same purposes as the tag 3 in FIGURE 1, is therefore also provided with a horseshoe-shaped line of perforations 5' which permits the central part 8' to be easily pushed out so that an oval opening will be formed which permits the tag to be slipped over the end of the spout 11 of a tea or coffee pot 12, as shown in FIGURE 3. While in the embodiment of the invention as illustrated in FIGURE 2, the tag 3' before being severed from the envelope 9 forms a part of one of the two layers of the envelope proper, it may, of course, also form a different part of the envelope and be provided with corresponding lines of perforations or slits 4' and the string 6' may be connected to the envelope 9 after the bag 1' is inserted therein and the flap 10 is closed by the staple 7' which is then clipped through all three layers. In this case, after being severed from the envelope, the tag will consist of three layers which are secured to each other by the fold between flap 10 and the lower layer of the envelope and the staple 7'.

The envelope 9 may either be made of ordinary paper which may also be printed with advertising matter and instructions as to its manner of use, or it may also be made of a more absorbent material. In the first case, tag 3' will only serve as a drop catcher which will take up a certain amount of liquid and prevent it from running along the spout to the bottom of the pot, while in the second case, the drops will be absorbed by the tag so that, even with a very leaky spout, no drops can ever pass downwardly beyond the tag or drip off therefrom.

In either embodiment of the invention, but especially in the embodiment according to FIGURE 1, tag 3 may also serve as a label on which advertising matter or instructions may be printed, since this part will never come into contact with the beverage contained in the pot and can therefore not possibly affect the taste thereof.

In FIGURE 3, the infusion bag 1 is shown as being inserted into the pot 12 which may be done by holding the bag firmly by the tag 3, or still better by first hooking the tag over the spout 11 and then dropping the bag into the pot 12 since there will then be no possibility that the string and tag might accidentally also drop into the pot.

As previously indicated, the invention—although with only some of its features—may also be applied to a tea or coffee cup into which an infusion bag of the type as described is dropped. The tag may then be hooked over the handle of the cup to prevent it from dropping into the cup while hot water is poured into the cup and on the bag to dissolve or extract its contents. In this case, the tag only needs to be provided with a straight slit or line of perforations (not shown) of a length in accordance with the span of the handle of the cup upon which the tag is placed. The walls of the cut formed by the slit or by the broken line of perforations in the tag then exert a sufficient clamping action from both sides upon the handle of the cup to prevent the tag from slipping off.

Although my invention has been illustrated and described with reference to the preferred embodiments thereof, I wish to have it understood that it is in no way limited to the details of such embodiments, but is capable of numerous modifications within the scope of the appended claims.

I claim:

1. An infusion device with a drop catcher, for preparing a beverage selected from the group consisting of tea and coffee in a pot having a projecting spout and for pouring out the prepared liquid from said spout, which comprises a bag of fibrous filtered material containing an infusible substance for preparing said beverage, said device having a top and bottom layer and an integral part attached to one of said layers along a line of separation, thereby permitting said part to be easily severed from the remainder of said layer, and said part constituting a handling tag after its separation, a string secured at its opposite ends to said tag and to said bag, respectively, said tag having a line of perforations within its circumference conforming substantially to the shape of a spout of the pot for easy lifting of a portion of said tag out of its plane, so as to form an aperture in said tag of a shape substantially complementary to the outer peripheral shape of the projecting spout of a pot into which said bag is placed for preparing said beverage, said aperture permitting said tag to be slipped over the end of and to be attached to said spout, so as to prevent said tag and said string from sliding into the pot, and a portion of the edge of said tag at said aperture then engaging at least with the lower side of said spout and adapted to serve as said drop catcher taking up drops of liquid running down from the pouring end of said spout.

2. An infusion device with a drop catcher, for preparing a beverage selected from the group consisting of coffee and tea in a pot having a projecting spout and for pouring out the prepared liquid from said spout, which comprises a bag of a fibrous filter material containing an infusible substance for preparing said beverage, said bag having a top and bottom layer of leaf material and an integral part attached to one of said layers along a line of separation, thereby permitting said part to be easily severed from the remainder of said layer, and said part constituting a handling tag after its separation, a string secured at its opposite ends to said tag and to said bag, respectively, said tag having a non-closing line of perforations of a substantially horseshoe shape within its circumference for easy lifting of a portion of said tag out of its plane, so as to form an aperture in said tag and said portion severed from said tag forming a tongue connected by the unperforated part to the remainder of said tag, said aperture permitting said tag to be slipped over the end of and to be attached to said spout, so as to prevent said tag and said string from sliding into the pot, and a portion of the edge of said tag at said aperture then engaging at least with the lower side of said spout and adapted to serve as said drop catcher taking up drops of liquid running down from the pouring end of said spout, and said tongue resting with a slight pressure on the upper side of said spout.

3. An infusion device with a drop catcher, for preparing a beverage selected from the group consisting of coffee and tea in a pot having a projecting spout for pouring out the prepared liquid from said spout, which comprises a bag of a fibrous filter material containing an infusible substance for preparing said beverage, an envelope receiving said bag, said envelope having a top and a bottom layer and an integral part attached to one of said layers along a line of separation, thereby permitting said part to be easily severed from the remainder of said envelope, and said part constituting a handling tag after its separation, a string secured at its opposite ends to said tag and to said bag, respectively, said tag having a non-closing line of perforations within its circumference substantially conforming to the shape of a spout of the pot, for easy lifting of a portion of said tag out of its plane, so as to form an aperture in said tag of a shape substantially complementary to the outer peripheral shape of the projecting spout of said pot into which said bag is placed for preparing said beverage, said aperture permitting said tag to be slipped over the end of and to be attached to said spout, so as to prevent said tag and said string from sliding into the pot and a portion of the edge of said tag at said aperture then engaging at least with the lower side of said spout and adapted to serve as said drop catcher taking up drops of liquid running down from the pouring end of said spout.

4. An infusion device with a drop catcher, for preparing a beverage selected from the group consisting of coffee and tea in a pot having a projecting spout for pouring out, assisted by said drop catcher, the prepared liquid from said spout, which comprises a bag of a fibrous filter material containing an infusible substance for preparing said beverage, an envelope receiving said bag, said envelope having a top and bottom layer and an integral part attached to one of said layers along a line of separation, thereby permitting said part to be easily severed from the remainder of said envelope, and said part constituting a handling tag after its separation, a string secured at its opposite ends to said tag and to said bag, respectively, said tag having a non-closing line of perforations of a substantially horseshoe-shape within its circumference for easy lifting of a portion of said tag out of its plane, so as to form an aperture in said tag and said portion severed from said tag forming a tongue connected by the unperforated part to the remainder of said tag, said aperture permitting said tag to be slipped over the end of and to be attached to said spout, so as to prevent said tag and said string from sliding into the pot, and a portion of the edge of said tag at said aperture then engaging at least with the lower side of said spout and adapted to serve as said drop catcher taking up drops of liquid running down from the pouring end of said spout, and said tongue resting with a slight pressure on the upper side of said spout.

References Cited by the Examiner
UNITED STATES PATENTS

| | | | |
|---|---|---|---|
| 1,362,054 | 12/20 | Stockman | 99—77.1 |
| 2,192,605 | 3/40 | Salfisberg | 99—77.1 |
| 2,298,420 | 10/42 | Salfisberg | 99—77.1 |
| 2,334,156 | 11/43 | Hansen | 99—77.1 |
| 2,335,159 | 11/43 | Salfisberg | 99—77.1 X |
| 2,793,954 | 5/57 | Nelson | 99—77.1 |
| 2,835,057 | 5/58 | Mathews. | |
| 2,852,389 | 9/58 | Johnson | 99—77.1 |
| 2,879,613 | 3/59 | De Mario | 99—77.1 X |

A. LOUIS MONACELL, *Primary Examiner.*

ABRAHAM H. WINKELSTEIN, RAYMOND N. JONES, *Examiners.*